(12) United States Patent
Shuch

(10) Patent No.: US 6,593,876 B2
(45) Date of Patent: Jul. 15, 2003

(54) ADAPTIVE MICROWAVE ANTENNA ARRAY

(75) Inventor: H. Paul Shuch, Cogan Station, PA (US)

(73) Assignee: The Seti League Inc., Little Ferry, NJ (US)

(*) Notice: Subject to any disclaimer, the term of this patent is extended or adjusted under 35 U.S.C. 154(b) by 0 days.

(21) Appl. No.: 09/928,013

(22) Filed: Aug. 10, 2001

(65) Prior Publication Data

US 2002/0063657 A1 May 30, 2002

Related U.S. Application Data

(60) Provisional application No. 60/224,967, filed on Aug. 11, 2000.

(51) Int. Cl.[7] .............................. G01S 3/02; G01S 5/02; H01Q 21/06
(52) U.S. Cl. ........................ 342/351; 342/362; 342/424
(58) Field of Search ................................ 342/362, 351, 342/424

(56) References Cited

U.S. PATENT DOCUMENTS

| | | | | |
|---|---|---|---|---|
| 4,623,891 A | * | 11/1986 | Johnson ...................... | 342/361 |
| RE33,152 E | * | 1/1990 | Atlas ........................... | 342/26 |
| 5,231,404 A | * | 7/1993 | Gasiewski ................... | 342/174 |
| 6,314,305 B1 | * | 11/2001 | Solondz et al. ............ | 455/562 |

OTHER PUBLICATIONS

Napier, Peter et al, "The Very Long Baseline", Proceedings of the IEEE, vol. 82, No. 5, May 1994, pp. 658–672.*
Rabideua, Daniel J., "Closed Loop Multistage Adaptive Beamforming", Conference Record of the Thirty–Third Asilomar Conference on Signals, Systems and Computers, Oct. 1999, pp 98–102.*
Napier, et al. The Very Large Array; Design & Performance of a Modern Synthesis Radio Telesope Proceedings of IEEE, vol. 71, No. 11, Nov. 83.

Bracewe 11, The Stantord Microwave Spectroheliograph Anetnna, a Microsteradian Pencil Beam Interferometer; IRE Transactions on Antennas & Propagation; Jan 1962.

M. Ryle; A New Radio Interferometer and its Application to observation of weak Radio Stars, Oct. 10, 1951.

Oliver, et. al. "Project Cyclops," Printed Aug 23, 1995; Chapters 4,5,6,7,8,9,10,11, Appendices F,G,H,L,M,N.

* cited by examiner

Primary Examiner—Gregory C. Issing
(74) Attorney, Agent, or Firm—Stephen D. Carver

(57) ABSTRACT

An antenna array of "n" individual parabolic dishes is arranged about a center in subarrays extending in North, East, South and West rows. Signals received by the antennas are combined into representations of the electromagnetic environment as viewed with various simultaneous beam geometries, through a combination of analog signal summation, and digital implementation of aperture synthesis techniques. All antennas monitor the same portion of sky. The array is able to scan the sky without physically moving the antennas. The angular resolution of the array greatly exceeds that of the individual antennas. A variety of different research objectives, such as targeted searches, all-sky surveys, sky mapping, interference studies, the study of a variety of natural astrophysical phenomena, and the search for intelligently generated microwave emissions of possible extraterrestrial origin, may be realized simultaneously.

16 Claims, 7 Drawing Sheets

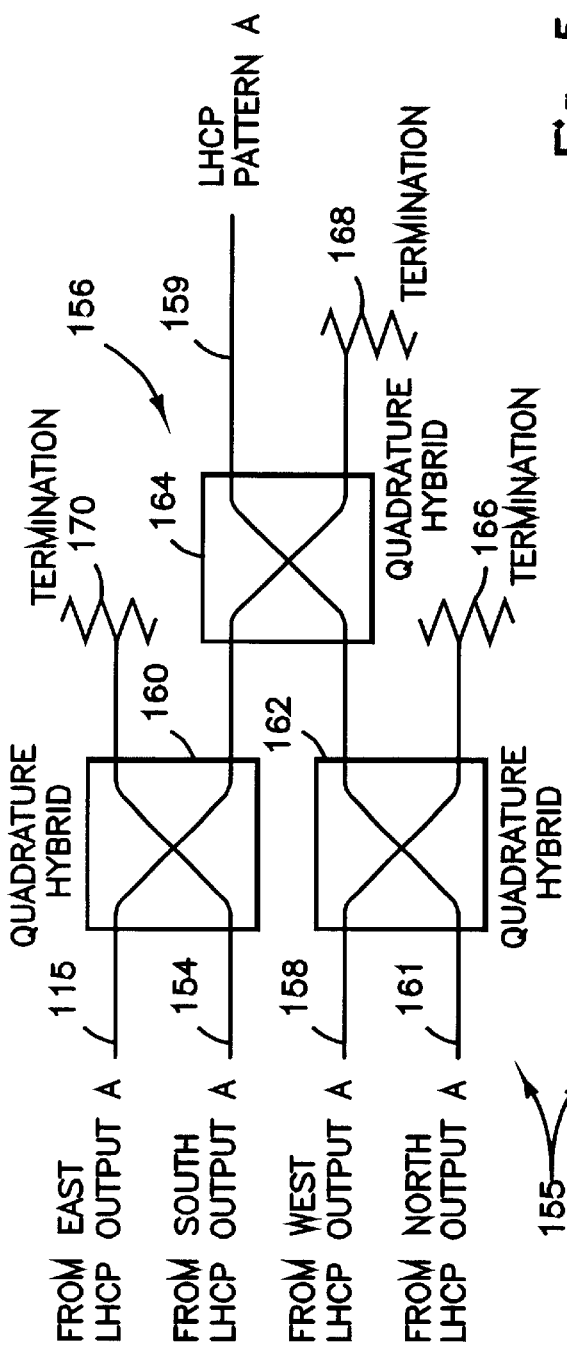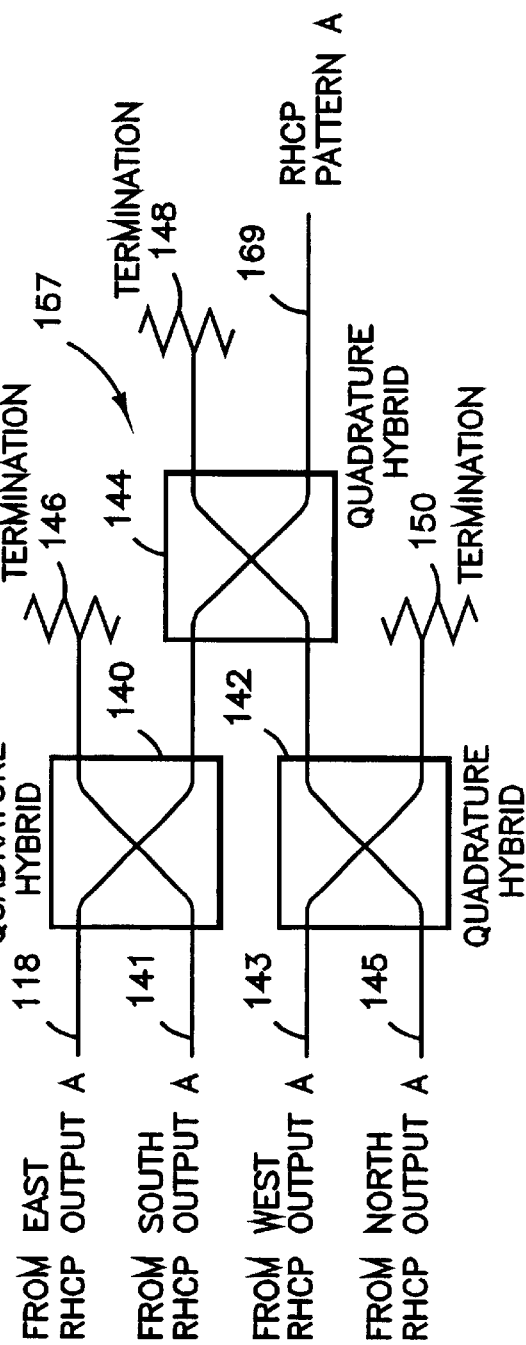
Fig. 5

ADAPTIVE MICROWAVE ANTENNA ARRAY

CROSS REFERENCE TO RELATED APPLICATION

This application is based upon, and claims the benefit of the filing date of prior U.S. Provisional Patent Application No. 60/224,967, entitled Adaptive Microwave Antenna Array, filed Aug. 11, 2000.

BACKGROUND OF THE INVENTION

I. Field of the Invention

The present invention relates generally to radio astronomy, and the microwave antenna arrays and systems utilized in such installations. More particularly, the present invention relates to multi-element antenna arrays primarily adapted for astrophysical research and the Search for Extra-Terrestrial Intelligence (SETI), and methods for electrically aiming them.

II. Description of the Prior Art

It has long been recognized by those skilled in the art that multiple antennas can be combined together for increased receiver performance. The advantages are numerous and well-known. Various forms of prior art technology exist for combining the antennas.

For example, in astrophysical research and the electromagnetic Search for Extra-Terrestrial Intelligence (SETI), it has been the common practice to combine multiple dish antennas into an array, optimized to produce a specific beam geometry. Beam geometries tend to be highly application-specific. For example, drift-scan SETI receiving stations are best served by an antenna pattern that is somewhat broader in the declination axis than it is in right ascension. Such a beam pattern was implemented by the late Ohio State University "Big Ear" radio telescope, circa 1964–1997, which was one of the great pioneers in SETI. Total power studies of the galactic core favor an opposite antenna pattern (that is, a geometry which is broader in right ascension than it is in declination). Targeted searches of individual stars and quasi-stellar objects require a spot beam, narrow in both planes.

At this time, in order to change from one beam pattern to another, different physical array geometries are used. Obviously this approach has limitations, especially when funds are limited, and thus only a single array geometry may be practicable. Alternatively, antennas may be physically relocated. This approach is obviously difficult, and often impractical. For example, the twenty-seven dish antennas at the multi-million dollar Very Large Array (VLA) in Socorro N. Mex. each weigh two hundred and thirty tons. To change this array between operating configurations, each of its dishes is moved along approximately thirty miles of railroad track. However, multiple diverse beam geometries often tend to be mutually exclusive. An adaptive antenna array, one that can operate in multiple geometric modes simultaneously, would be highly advantageous.

The advantages gained by combining multiple antennas into an array are well known, and fall into two broad categories: (a) improving sensitivity, and (b) improving resolution. The two most common ways of connecting multiple antennas into an array are (a) as a radiometer, and (b) into correlation detectors. (Burke and Graham-Smith, 1997). In the case of the radiometer connection, a single detector is connected to all of the antennas in the array via a branched feedline, which maximizes sensitivity by producing a single beam. The best known (though never implemented) example of this configuration is Project Cyclops (Oliver et. al., 1973).

With interferometers (Ryle, 1952), resolution is improved by combining the signals of two antennas which are separated by a specified distance (called the baseline). With dish antennas, the resulting gain is simply that which would be achieved by a single dish with a surface area equal to the sum of that of the two antennas. However, the angular resolution of such an interferometer is equivalent to that of a single dish with a diameter equal to the baseline. Thus, interferometers provide a modest improvement in sensitivity with a much greater increase in resolution. A multiple-antenna interferometer array may be constructed using a technique known as aperture synthesis. Each possible pairing of antennas in the array is accomplished by applying the outputs of the antennas to a multitude of correlator circuits. The correlator outputs may be combined to produce multiple beams, making it possible to image distant astrophysical objects with high levels of detail. Well-known multiple-antenna interferometers include the Very Large Array (Napier et. al., 1983) and the Giant Meter-Wave Radio Telescope (Swarup et. al., 1991). Both of these arrays arrange their antennas (27 in the case of the VLA; 30 at the GMRT) in a "Y" configuration with extremely wide baselines, and use digital correlators to combine the signals from the multiple dishes.

The Mills Cross arrangement (Mills, 1963) consists of two line-type antennas, one oriented North-South and the other East-West. The former antenna produces a beam pattern which is narrow in declination and broad in right ascension. The latter produces a beam pattern which is broad in declination and narrow in right ascension. When signals from the two antennas are combined, a beam is produced which is narrow in both axes.

Bracewell and Swarup (1961) produced an array of thirty-two small parabolic dish antennas, oriented in a Mills Cross arrangement, to produce a pencil-beam interferometer with micro-steradian resolution. All of the antenna arrays described above achieve stated design goals of high sensitivity or high angular resolution. In each case, one and only one of these design objectives can be achieved, often at the expense of the other.

Known prior art concepts are discussed in the following references:

Bracewell, R. N., and G. Swarup, *The Stanford Microwave Spectroheliograph Antenna: A Pencil Beam Interferometer*, IRE Trans. Antennas and Propagation, vol. AP-9, pp. 22–30, January 1961.

Mills, B. Y., *Cross-type Radio Telescopes*, Proc. IRE Australia, vol. 24, pp. 132–140, 1963.

Ryle, M., *A New Radio Interferometer and Its Application to the Observation of Weak Radio Stars*, Proc. Royal Soc. London Ser. A, vol. 211, pp. 351–375, 1952.

Burke, B. F., and F. Graham-Smith, *An Introduction to Radio Astronomy*, Cambridge University Press, 1997.

Swarup, G., S. Ananthakrishnan, V. K. Kapahi, A. P. Rao, C. R. Subrahmanya, and V. K. Kulkarni, *The Giant Meterwave Radio Telescope*, Current Science, vol. 60 no. 2 pp. 95–105, Jan. 25, 1961.

Napier, P. J., A. R. Thompson and R. D. Eckers, *The Very Large Array, Design and Performance of a Modern Synthesis Radio Telescope*, Proc. IEEE, vol. 71 no. 11 pp. 1295–1320, November 1983.

Oliver, B. M., and J. Billingham, eds., *Project Cyclops, A Design Study of a System for Detecting Extraterrestrial Intelligent Life*, NASA CR 114445, 1973.

SUMMARY OF THE INVENTION

The invention presents an array of small, dish antennas all united to accomplish specific beam patterning. Preferably the array comprises n individual antennas. Four subarrays, each with (n/4) individual antennas, are established in a cross-like formation, with a subarray running north, south, west and east. The array resembles the Bracewell and Swarup array in physical configuration. Unique circuitry is added to allow it to operate both as a total-power radiometer, and as a correlated interferometer, simultaneously. These multiple operating modes allow the array to achieve both high sensitivity and high angular resolution, fulfilling a variety of research objectives.

A solution is provided for electronically changing a complex, multiple-antenna array into different configurations yielding different beam patterns. In other words, radio signals derived from the four subarrays can be electronically processed and combined into a variety of beam patterns. These multiple patterns are synthesized through a combination of analog in-phase combining means, analog phase-quadrature signal combining means, and digital conversion and software correlation means. As different individual antennas forming each subarray all monitor the same broad portions of sky, such analog and digital processing of signals derived from the individual antennas can be processed not only to yield the composite observed target sought by the radio telescope, but can produce high angular resolution beam patterns subtending selected portions of the overall sky coverage.

Thus a basic object is to provide an adaptive antenna array system which can operate in multiple geometric modes simultaneously.

Fundamentally, it is desired to be able to electronically convert a radiotelescope and switch it between beam patterns.

Another fundamental object is to electronically aim an antenna system comprising multiple subarrays of multiple antennas.

A related object is to provide an adaptive antenna array of the character described that can achieve a beam pattern that is broader in the elevation axis than in the azimuth axis.

Conversely, another object is to provide an adaptive antenna array of the character described that can achieve a beam pattern that is broader in azimuth than in elevation.

A related object is to provide an electronic means of creating a beam geometry narrower in both azimuth and elevation that those of the individual antennas, so as to improve angular resolution, to aid in the study of individual stars, quasi-stellar objects, and other deep space targets.

Another object is to provide an array that can produce multiple, simultaneous spot beams, allowing detailed sky maps to be developed.

A major object is to simplify the changing from one beam pattern to another.

A still further object is to maximize sky coverage while minimize the necessity of physically moving antennas.

Another basic object is to provide a highly versatile multiple antenna array system suitable for use by universities or layman, public and private owners, and/or professional and amateur observers.

Recognizing that some beam patterns in microwave antenna arrays are best achieved by digital processing, and that different beam patterns are better achieved through analog processing, a final object is to provide multiple signal outputs from each antenna in the array, to allow simultaneous analog and digital processing of the available signals.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a block diagram of a preferred quadrature, analog coupler subassembly that combines the signals from all four sub-arrays into a single beam pattern;

DETAILED DESCRIPTION

Figure 6:
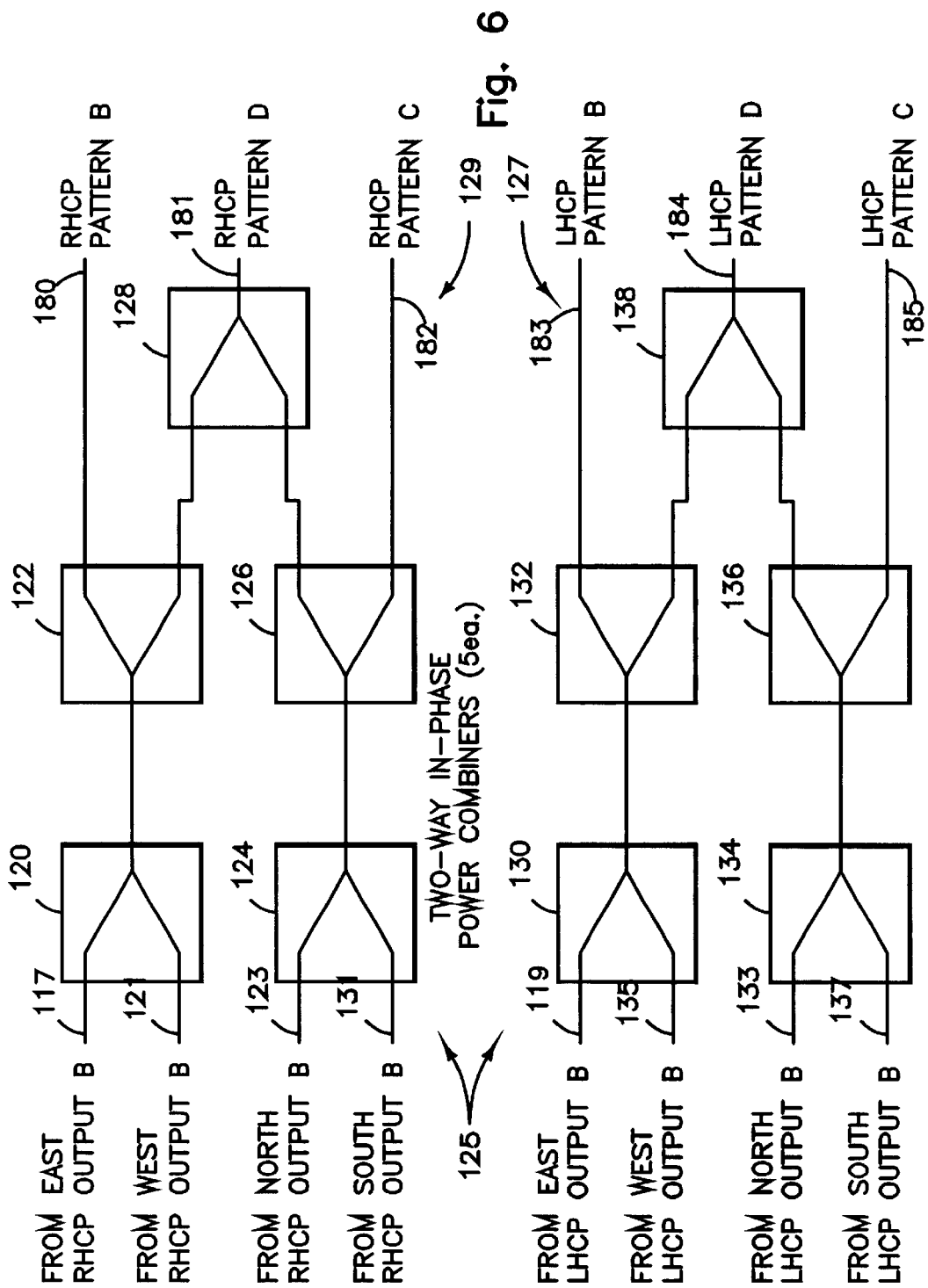
FIG. 6 is a block diagram of a preferred in-phase, analog coupler subassembly that combines the signals from pairs of sub-arrays into three additional beam patterns; and, FIG. 7 is a diagrammatic view showing five distinct antenna beam patterns, plotted in elevation vs. azimuth, all simultaneously obtainable with the invention.
Figure 7:
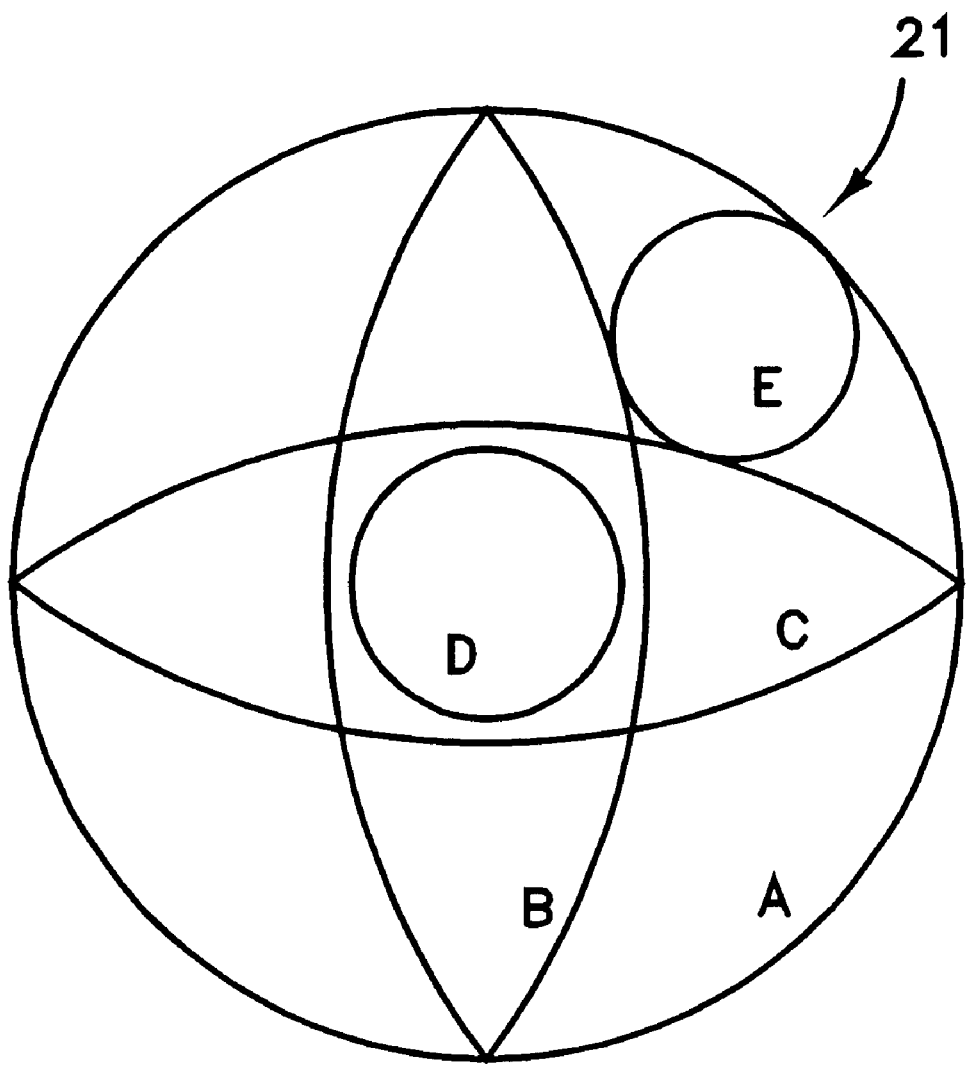

Turning now to FIGS. 1–7 of the appended drawings, the multiple antenna array 22 constructed in accordance with the best mode of the invention, electronically switches between the beam patterns A–E (collectively represented by the reference numeral 21) that are represented schematically in FIG. 7. Switching is accomplished through a combination of analog and digital signal combining techniques. Array 22 (FIG. 1) simultaneously produces beam patterns A–E (FIG. 7). Pattern A (FIG. 7) is broad in both azimuth and elevation, providing maximum sky coverage with minimum resolution. Beam pattern B, which is narrow in azimuth and broad in elevation, is optimized for meridian transit ('drift-scan') sky surveys. Beam pattern C, which is broad in azimuth and narrow in elevation, maximizes sky coverage in the equatorial plane while providing high resolution in the elevation axis. Beam pattern D comprises a narrow spot-beam formed by the intersection of patterns B and C, for higher resolution follow-up scrutiny of candidate signals detected in the earlier modes. Beam pattern E is a narrow spot-beam which is steerable electronically and instantaneously anywhere within the beamwidth of the individual antennas comprising the array. Pattern E is most useful for sky-mapping studies and, in the preferred implementation, will produce a multiplicity of narrow and overlapping spot beams, collectively filling the search space depicted in Pattern A.

The multi-antenna array 22 (FIG. 1), constructed in accordance with the teachings of the invention, preferably comprises four subarrays each having "n/4" individual antenna assemblies 23. In the best mode, the total number of antennas (i.e., normally a plurality of ground-based, parabolic dish assemblies 23) is designated by the variable number "n" that is an integer multiple of four. The antenna assemblies 23 are physically arranged in orderly rows that emanate outwardly from a specified, central location 25 (known as the array phase center). Location 25 actually comprises a structural building sheltering computers and other components of the array 22. In the best mode, the array comprises four subarrays oriented along baselines radiating outwardly from the array center 25. Ideally each subarray comprises n/4 individual, equally spaced-apart antenna assemblies 23. In the best mode each antenna comprises a conventional dish antenna with a parabolic reflector. However, other individual high-gain antennas including, but not limited to, helices, Yagis, and loop designs are acceptable.

An East Subarray 30 (FIG. 1) comprises n/4 individual antenna assemblies 23 oriented equidistant along a baseline radiating from the array phase center 25 in a direction to the true East. A West Subarray 40 comprises n/4 antennas oriented equidistant along a baseline radiating westerly from the array phase center 25. Similarly, (n/4) antenna assemblies 23 oriented equidistant along a baseline radiating from the array phase center in a direction to the true North constitute a North Subarray 36. The n/4 antennas oriented equidistant along a baseline radiating from the array phase center in a direction to the true South constitutes a South Subarray 38.

Figure 1:
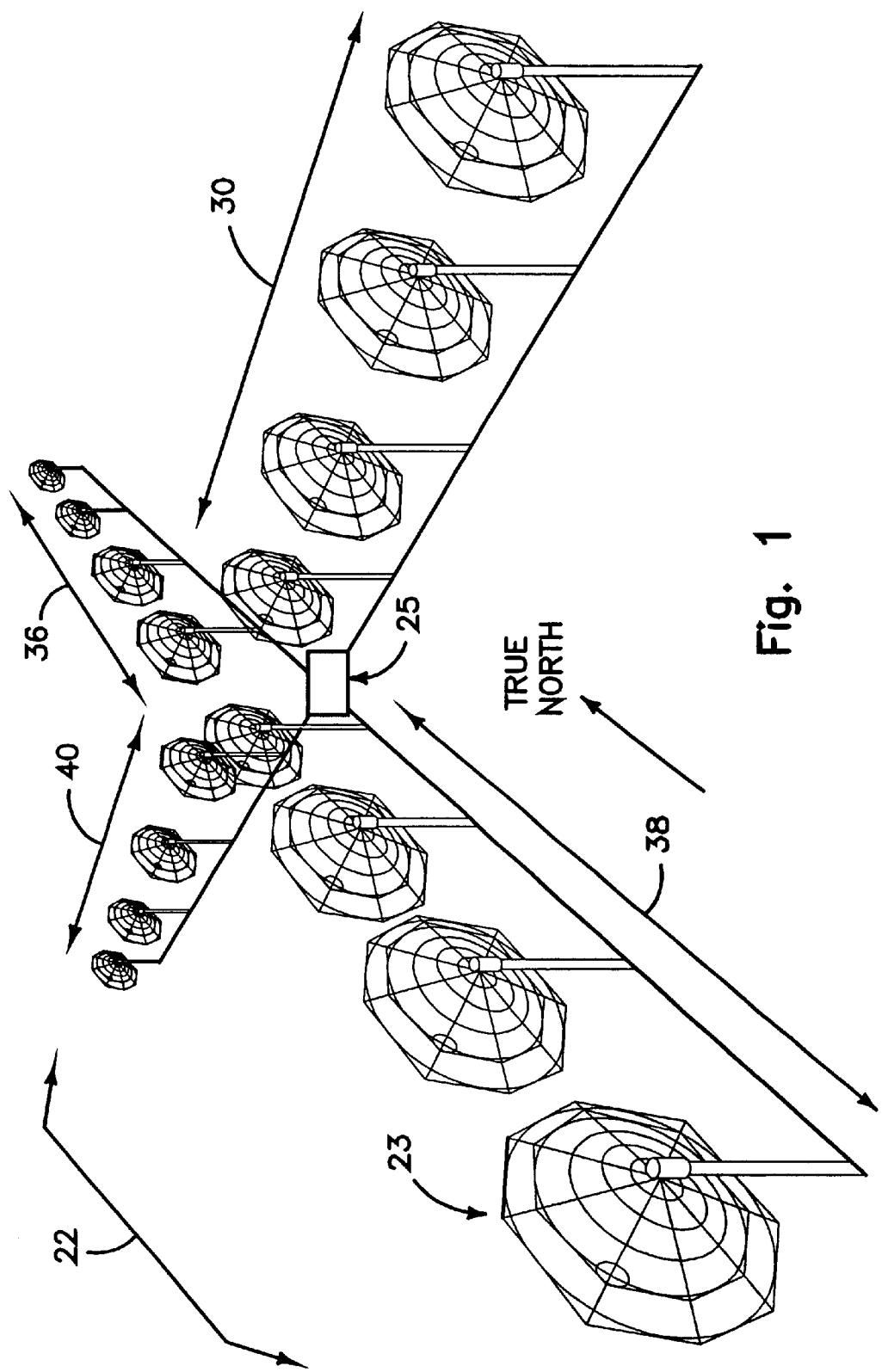
FIG. 1 is a pictorial view of a preferred embodiment of a complete antenna array comprising sixteen individual dish antenna assemblies.
Figure 2:
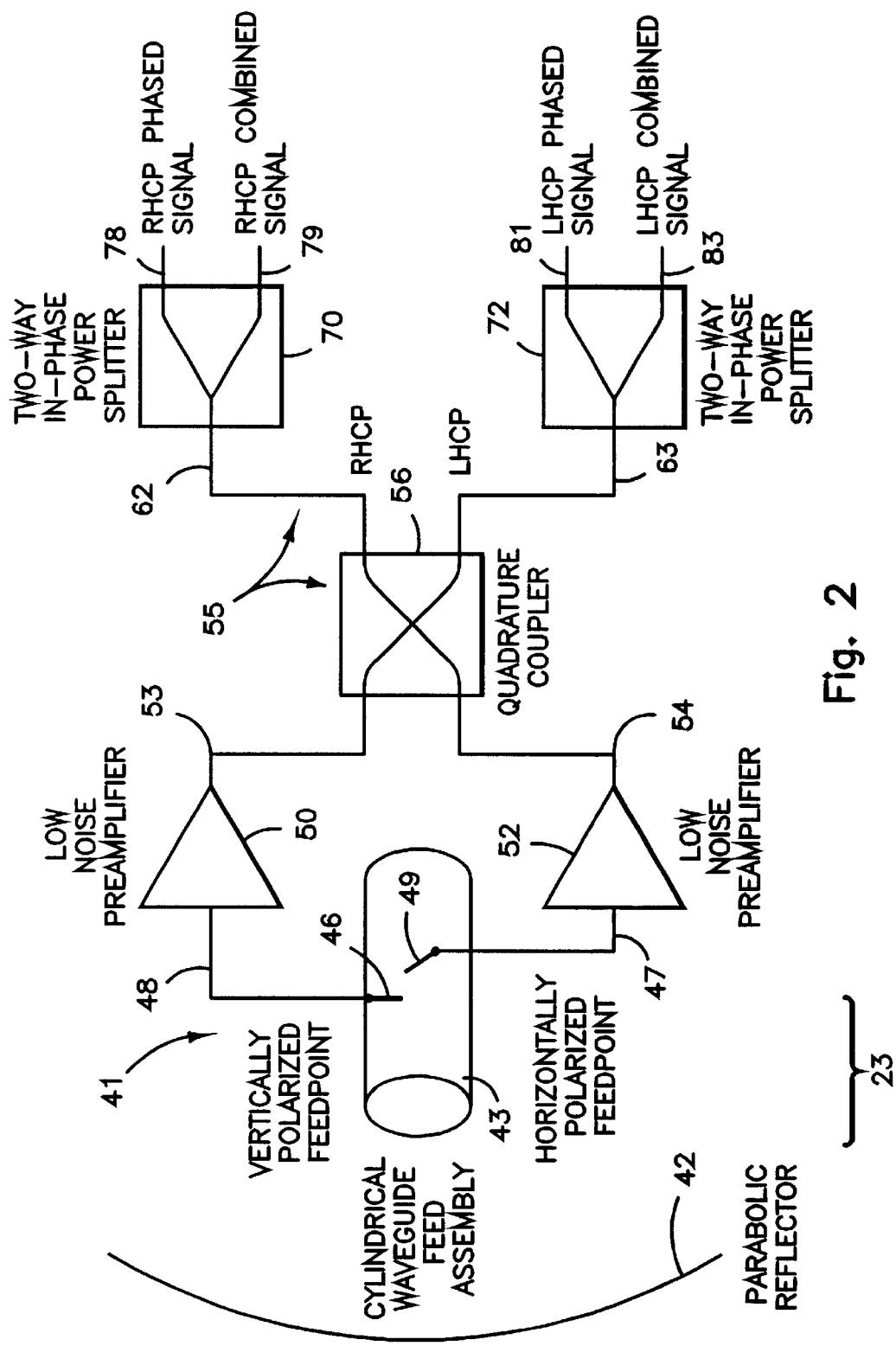
FIG. 2 is block diagram of the preferred antenna feed assembly hardware, which is associated with each individual antenna.

The array comprises n antenna assemblies, where n is an integer multiple of four. Each of the sixteen illustrated antenna assemblies 23 comprises an identical feed assembly, 41 (FIG. 2), that is mechanically disposed over the parabolic reflector 42 at the focal point to collect signals reflected by the dish. FIG. 2 shows the prime-focus feed assembly mounted to each of the sixteen dishes in the illustrated array. Note that each feed assembly consists of a cylindrical wave guide feedhorn 43 (preferably including a conventional choke ring, not shown) operational over the array's preferred 1.3 to 1.7 GHz bandwidth. The feedhorns 43 are each fitted with two conventional, orthogonally polarized monopole probes, schematically indicated as 46 and 49 (FIG. 2). The probes provide dual linear polarization, and they physically project from and are mounted to the center pin of type N coaxial connectors fitted to the feedhorn 43 in radially spaced apart relation. Gain and phase-matched low noise amplifiers 50, 52 (i.e., LNAs) are attached to the two probe connectors via identical short lengths 47, 48 of low-loss coaxial cable. Using matched, low-loss coaxial cables 53, 54, the outputs of each LNA preamplifier 50, 52 are connected to a microstrip quadrature coupler and dual in-phase power splitter assembly 55 (FIG. 2), to produce two RHCP signals (referred to here as Phased and Combined), and two LHCP signals, similarly labeled. The phased outputs will be used downstream for digital correlation, and the combined signals drive analog combiner circuitry, as described hereinafter.

It is important to note that the success of this array depends upon precise phase and gain matching of all thirty-two (i.e., 2n) LNAs in the system, not only across the operating frequency spectrum, but also over temperature and with changes in applied operating potential. The use in all LNAs of high electron mobility field effect transistors (i.e., HEMTS), and monolithic microwave integrated circuits (i.e., MMICs) from the same production wafer, and microstrip circuit boards etched from the same physical substrate stock, is preferred. For consistency, it is expected that any spare LNAs likely to be needed over the life of the array will have to be manufactured in the same production run as those initially placed into service.

Figure 3:
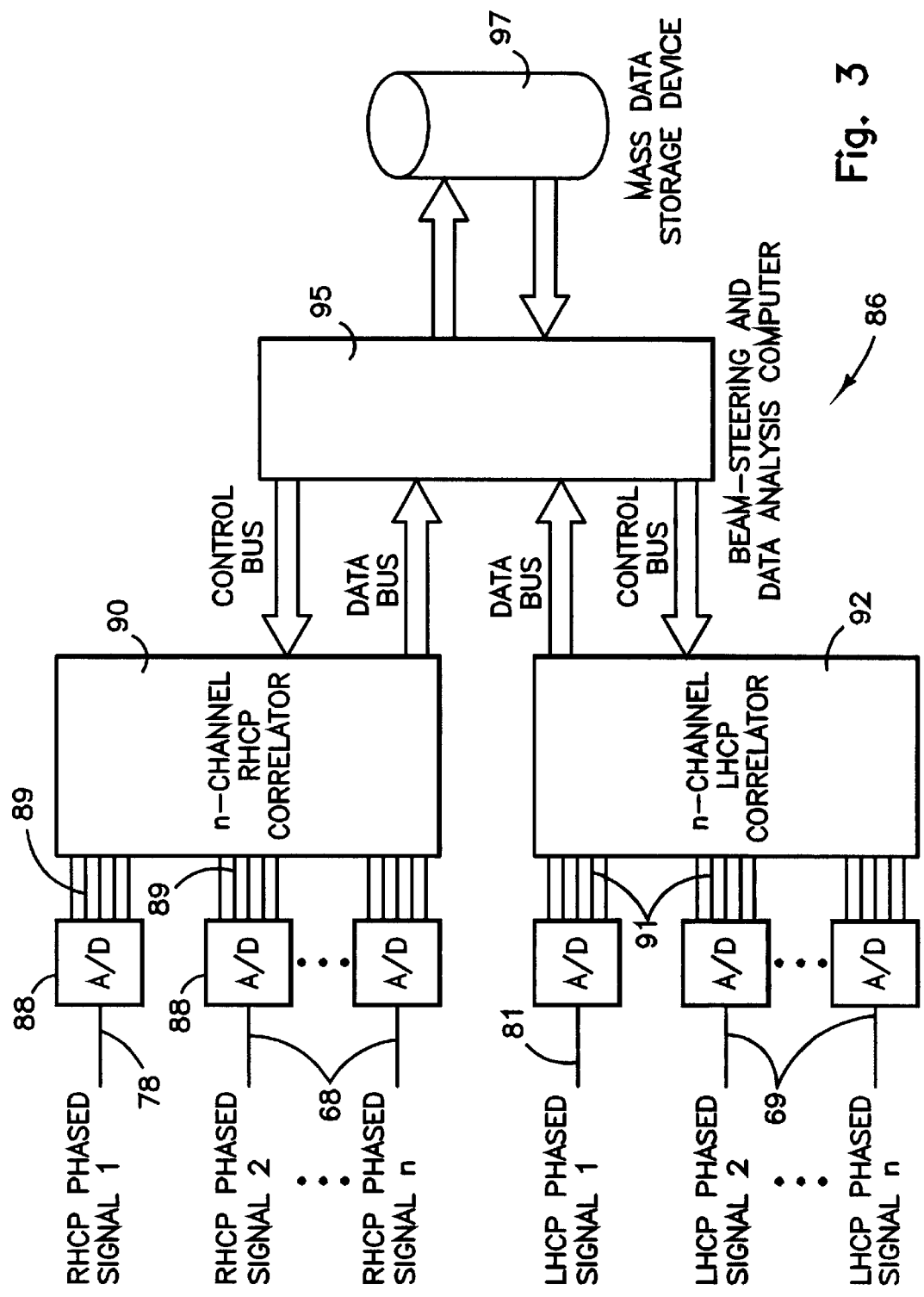
FIG. 3 is a block diagram of the single, preferred digital signal correlator assembly that performs aperture synthesis on the signals from all "n" individual antennas in the entire array.

Preferably each feedhorn 43 is spaced-apart from reflector 42 (FIG. 2) such that proper illumination is achieved, according to well known standards of the art. Probes 46, 49 extending within the feedhorn 43, at ninety-degree, radially spaced apart locations, provide outputs on coaxial lines (i.e., adapters) 47, 48, that are respectively delivered to sensitive, Low Noise Preamplifiers (LNA's) 50, 52, that drive quadrature coupler 56 (FIG. 3). The signals from LNA's 50, 52 are equal in amplitude and phase, but are orthogonally polarized relative to one another. The quadrature coupler 56 (FIG. 2) receives the orthogonal linear outputs of each LNA 50, 52. Each of quadrature couplers 56 (i.e., associated with each of the n antenna assemblies 23) produces two simultaneous outputs, equal in amplitude and in phase, but of two orthogonal circular polarizations. A Right Hand Circular Polarization (RHCP) signal appears on coaxial line 62. A Left Hand Circular Polarization signal (LHCP) is outputted by the quadrature coupler 56 on coaxial line 63.

The twin, in-phase, two-way power splitters 70, 72 (FIG. 2) receive the quadrature coupler's output signals on lines 62 and 63 respectively. Each power splitter outputs an analog "Combined Signal" for subsequent analog processing, and an analog "Phased Signal" for subsequent digital processing. For example, power splitter 70 outputs an RHCP (i.e., right hand circular polarization) phased signal on line 78, and an RHCP combined signal on line 79. Splitter 72 outputs an LHCP Phased signal on line 81 and an LHCP combined signal on line 83. The phased and combined signals emanating from each power splitter 70 or 72 are equal in amplitude and phase, and are effectively isolated from one another.

Thus each of the n antenna assemblies 23 provides the following four output signals: RHCP Phased, RHCP Combined, LHCP Phased, and LHCP Combined. FIG. 3 shows how we will perform digital processing of the quantity "2n" RHCP and LHCP phased signals derived from all n antennas in the array. The object is to produce by aperture synthesis a pair of detailed amplitude gradient maps, one in each of the two orthogonal circular polarizations, to resolution Pattern E (FIG. 7), of that total sky coverage represented by Pattern A. (Analog processing of the quantity "2n" RHCP and LHCP Phased Signals, to produce beam patterns A, B, C, and D of FIG. 7, will be discussed subsequently.)

The complete array 22 outputs to a correlator assembly 86 (FIG. 3) that comprises two correlators 90, 92, one to process the n RHCP correlated signals and one to process the n LHCP correlated signals ultimately derived from the n feed assemblies (FIG. 2). In other words, the digital correlator assembly 86 (FIG. 3) processes phased RHCP and LHCP signals from all n individual antennas. It will thus be appreciated, for example, that RHCP phased output line 78 (FIG. 2) corresponds to A/D input line 78 of FIG. 3. Phased RHCP signals from other antennas appear on lines 68 (FIG. 3). Likewise, LHCP phased output line 81 (FIG. 2) corresponds to A/D input line 81 of FIG. 3. Phased LHCP signals from the other antennas enter correlator assembly 86 via lines 69. Thus, a quantity of "2n" phased signals is delivered to individual corresponding Analog-to-Digital Converters 88 (i.e., ADC's). Each ADC 88 (FIG. 3) digitizes the analog signals delivered thereto, and preserves amplitude and phase information, thus producing simultaneous RHCP and LHCP digital signal representations, and outputting them on lines 89 and 91 respectively (FIG. 3.)

A pair of n-input digital signal correlators 90, 92 (FIG. 3) is driven, one by the n digitized RHCP digitized signals and the other by the n digitized LHCP signals respectively. Each correlator 90, 92 is controlled by and provides its data output to a beam steering and data analysis computer 95. Computer 95 instructs each correlator 90, 92 to look at its n inputted signals, analyzing data from two antenna assemblies 23 at a time, in every possible combination. For each possible pair of signals a voltage sum is computed, one of the signals is digitally phase shifted a selected increment, i.e., one degree, and they are added again. This process is repeated independently for the RHCP and LHCP digitized signals, in their respective correlators 90, 92, until voltage sums have been obtained for each possible pair of signal samples over a phase range of zero to 180 degrees.

The above process generates massive quantities of data. The computer 95 outputs this data to a conventional mass data storage means 97, as depicted in FIG. 3, which comprises a bank of hard drives, read-write CDROMS, a network connection, or the like. The computer then analyzes the data thus stored, for each of the possible signal pairs in all of the possible phase relationships, looking for voltage maxima. Each voltage maximum observed for each antenna pair analyzed is a representation of the incident signal falling on the array from a particular direction on the sky (one possible Pattern E in FIG. 7, out of a plethora of such patterns) within the total spatial coverage (Pattern A in FIG. 7) of the entire array. Thus, the data analysis computer creates from the aggregate of fixed antennas a plethora of simultaneous spot beams on the sky, each of size and resolution corresponding to Pattern E in FIG. 7, and collectively filling the entire coverage area Pattern A in FIG. 7.

From these spot beams, the computer is able to create in software an amplitude contour map, to the resolution E from FIG. 7, of that sky coverage encompassed by pattern A of FIG. 7. This total sky coverage is inversely proportional to the physical size of the antennas used in the array; the smaller the antennas, the greater the area of sky observed at any given time. The resolution achieved is directly proportional to the number of antennas used in the array; the more individual antennas, the smaller the area of the multiple spot beams (E in FIG. 7) produced by the correlator system.

In the foregoing paragraphs, we have disclosed how aperture synthesis is accomplished by digital processing of the quantity "2n" phased signals from the n antenna feed assemblies. Concurrently, analog circuitry is applied to the quantity "2n" Combined Signals from the n antenna feed assemblies, to produce four simultaneous, independent beam patterns on the sky. These multiple beam patterns (i.e., patterns B–E in FIG. 7) serve the needs of various astrophysical and SETI research projects, including sky surveys and targeted searches of natural and artificial electromagnetic phenomena. It is a feature of the present invention that the two separate analysis techniques, analog and digital, can be accomplished simultaneously, effectively doubling the search space for any given radio astronomical study.

Figure 4:
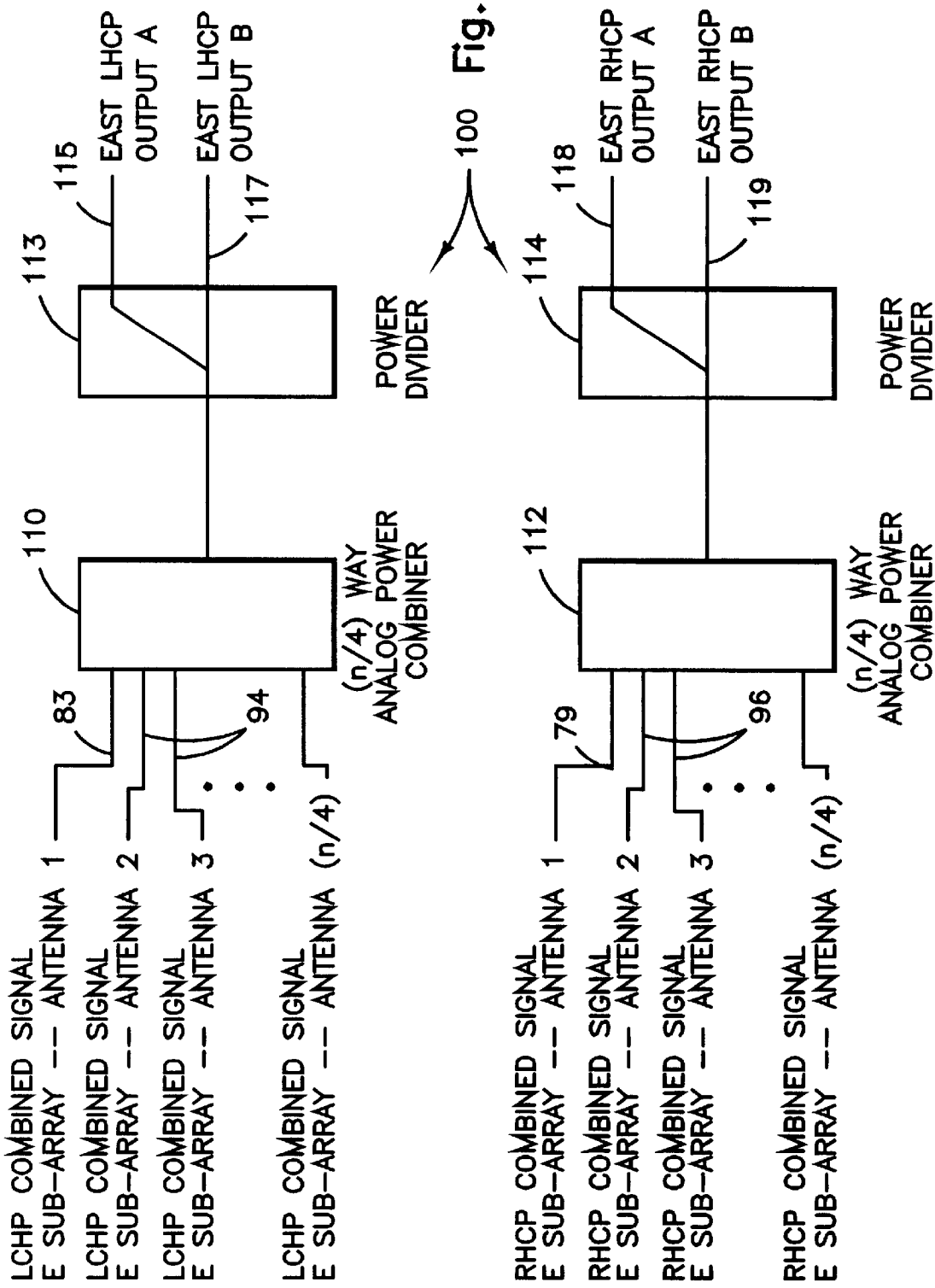
FIG. 4 is a block diagram of a preferred in-phase, analog coupler assembly associated with each subarray that combines signals from "n/4" antennas in each individual subarray of antennas.

The RHCP and LHCP "Combined Signals" (FIG. 2) generated by each antenna 23 (FIG. 1) are delivered to the analog power combiner assembly 100 (FIG. 4). Each sub-array of antennas requires its own power combiner 100. The power combiner 100 as illustrated is actually wired to the East subarray, but the three other required power combiners associated with each other subarray of antennas, are preferably identical. In the left side of FIG. 4 it will be noted that (n/4) LHCP Combined Signals are delivered to an (n/4)-input analog power combiner 110. A typical LHCP combined signal from one antenna in the array appears on line 83 in FIGS. 2 and 4. Additional LHCP combined signals derived from other antennas in the subarray are delivered to lines 94 of power combiner 110 (FIG. 4). Concurrently, FIG. 4 shows that (n/4) RHCP Combined Signals are delivered to an (n/4)-input analog power combiner 112. A typical RHCP combined signal from one antenna appears on line 79 of FIGS. 2 and 4. The RHCP combined signals from other antennas in the East subarray are delivered to lines 96 of power combiner 112 (FIG. 4). It will thus be appreciated, for example, that an RHCP signal outputted on line 79 (FIG. 2) derived from one of the antennas in the East subarray 30 corresponds to line 79 in the East array's power combiner assembly 100 (FIG. 4). Likewise, LHCP combined signal outputted on line 83 (FIG. 2) corresponds to input line 83 of FIG. 3.

Thus, the antennas can be grouped into four distinct sub-arrays, each radiating in directions to the true North, South, East and West of the array center. These groups of multiple antennas are called the North, South, East and West subarrays, respectively. A total of four RHCP and four LHCP signal samples are thus produced by implementing, for each polarity and for each subarray, the linear power combiner circuitry depicted in FIG. 4.

The outputs from each of the power combiners 110, 112 (FIG. 4) drive two-port, in-phase, analog power dividers 113, 114 (FIG. 4) respectively. For each subarray of antennas, this produces two identical, analog RHCP signal components, and an additional two identical analog LHCP signal components. Thus the EAST subarray power combiner 100 (FIG. 4) produces and outputs four distinct signals, comprising LHCP outputs A, and B, on lines 115, 117 respectively, and RHCP outputs A, B appearing on lines 118, 119 (FIG. 4) respectively. The two identical signal components A and B available for each of the four available subarrays, in each of the two available polarizations, will be further processed as discussed in the following paragraphs. In general, outputs A will be combined in analog circuitry to produce an angularly broad beam pattern, while outputs B will be combined in analog circuitry to produce multiple, angularly narrow beam patterns.

Thus, for the entire array of n antennas, comprising four subarrays each having n/4 antennas, sixteen analog signal components result. The available analog signal components outputted by the power combiners associated with each subarray, are as indicated in the following Table 1:

TABLE 1

| | Total 2n Signal Outputs | | | |
|---|---|---|---|---|
| | RHCP | | LHCP | |
| East (FIG. 4) | A | B | A | B |
| West | A | B | A | B |
| North | A | B | A | B |
| South | A | B | A | B |

Note that only the circuitry associated with the East subarray is depicted in FIG. 4. Identical circuitry is used to produce the two RHCP and two LHCP signal components for each of the three remaining subarrays.

The net effect is that the combiner assembly 100 (FIG. 4) for each of the four antenna subarrays (i.e., North, East, West, and South) produces four outputs. Four sets of LHCP Outputs A and B are produced by the four power combiners 100 used with the north, south, east and west subarrays. Four sets of RHCP Outputs A and B are similarly produced. These sixteen signals will be further processed by the circuitry depicted in FIGS. 4 and 5, thus producing beam antenna patterns A, B, C, and D illustrated in FIG. 7.

Referring jointly now to FIGS. 4 and 5, Output A and Output B signals are applied to Quadrature Antenna Coupler assembly 155 (FIG. 5) that comprises identical LHCP and RHCP subassemblies 156, 157 respectively. LHCP OUTPUT A signals (i.e., from power divider 113 in FIG. 4) from each of the four subarrays NORTH, SOUTH, EAST and WEST are applied to inputs of quadrature subassembly 156. The LHCP Quadrature Antenna Coupler Subassembly 156 comprises three interconnected quadrature hybrids 160, 162, and 164 with three ports terminated in resistive loads 170, 166 and 168 respectively shown in (FIG. 5), to produce a single composite signal which is angularly broad in both azimuth and elevation. Quad hybrid 160 receives an input on line 115 corresponding to the East subarray LHCP output A on line 115 of FIG. 4. The south LHCP output A signal is applied to line 154. Similarly, the West subarray LHCP output A signal is applied to quad hybrid 162 on line 158 and the North LHCP output A signal is applied to hybrid 162 via line 161. The output of quadrature hybrid 164 (FIG. 5) on line 159 (i.e., the output of the LHCP Quadrature Antenna Coupler Subassembly 156) produces an LHCP antenna pattern as depicted in FIG. 7, Beam Pattern A.

Similarly, an RHCP OUTPUT A signal is derived from the four subarrays NORTH, SOUTH, EAST and WEST. Each subarray power divider, such as divider 114 in FIG. 4, outputs to Quadrature Antenna Coupler Subassembly 157 (FIG. 5). The RHCP Quadrature Antenna Coupler Subassembly 157 consists of three interconnected quadrature hybrids 140, 142, and 144 with three ports terminated in resistive loads 146, 150 and 148 respectively as shown in FIG. 5, to produce a single composite signal which is angularly broad in both azimuth and elevation. Line 118 (FIGS. 4, 5) delivers the East subarray RHCP output A signal to quad hybrid 140. An RHCP output A signal from the south subarray reaches quad hybrid 140 (FIG. 5) on line 141. Similarly, lines 143 and 145 respectively deliver West RHCP Output A and North RHCP output A signals to quad hybrid 142. The output from the RHCP Quadrature Antenna Coupler Subassembly 157 outputs on line 169 and produces an RHCP antenna pattern as depicted in FIG. 7, Beam Pattern A. Lines 159, and/or 169, for example, may be delivered to the antenna input terminals of a modern microwave receiver.

Thus, for each of the two available orthogonal polarizations, we have summed the outputs of multiple antennas so as to produce beams which maximize sky coverage.

Referring jointly now to FIGS. 4 and 6, the OUTPUT B signals (i.e., from power dividers 113, 114 in FIG. 4) from each subarray are applied to a Linear Antenna Coupler Assembly 125 (FIG. 6). The coupler assembly 125 comprises an LHCP Linear Antenna Coupler Subassembly 127, and an identical RHCP Linear Antenna Coupler Subassembly 129. The RHCP Linear Antenna Coupler Subassembly 129 comprises five, two-way, in-phase power dividers 120, 122, 124, 126, and 128 interconnected as shown in FIG. 6. Similarly, the LHCP subassembly 127 (FIG. 6) comprises five, two-way, in-phase power dividers 130, 132, 134, 136, and 138. East and West RHCP output B signals are respectively applied to subassembly 129 (i.e., divider 120) on lines 117 and 121. North and South RHCP output B signals are respectively applied to divider 124 via lines 123 and 131 (FIG. 6). East and West LHCP output B signals are respectively applied via lines 119 and 135 to subassembly 127 (i.e., divider 130). Finally, suitable North and South LHCP output B signals derived from dividers similar to power divider 100 (FIG. 4) are respectively applied to divider 134 (FIG. 6) on lines 133 and 137.

The above interconnections will allow us to produce three simultaneous and independent signal representations for each of the two available orthogonal polarizations. One of these signal representations is that of a line of individual antennas oriented from East to West. The second such signal representation is that of a line of individual antennas oriented from North to South. The third such signal representation is an algebraic sum of the previous two signals.

The first pair of outputs from Linear Antenna Coupler assemblies 125 appear on output lines 180 and 183, producing beam Pattern B (FIG. 7) with RHCP and LHCP polarizations, respectively. This results because the signals appearing at output lines 180 and 183 are derived solely from the East and West subarrays, thus from antennas which are oriented along an East-West baseline.

The second pair of outputs from Linear Antenna Coupler assemblies 125 appear on output lines 182 and 185, producing beam Pattern C (FIG. 7) with RHCP and LHCP polarizations, respectively. This results because the signals appearing at output lines 182 and 185 are derived solely from the North and South subarrays, thus from antennas which are oriented along a North-South baseline.

The third pair of outputs from the Linear Antenna Coupler assemblies 125 appear on output lines 181 and 184, producing Beam Pattern D (FIG. 7) with RHCP and LHCP polarizations, respectively. This results because the signals appearing at output lines 181 and 184 are derived by summing the outputs of a group of antennas oriented along a North-South baseline, with the outputs of a similar group of antennas oriented along an East-West baseline. Lines 180–185 can be connected to the input terminals of a suitable microwave receiver.

As is common astronomical practice, the term Baseline as used above implies a specific, equidistant linear distribution of multiple antenna elements, oriented in a particular specified direction.

Specifically, the described antenna array produces five independent and simultaneous output signals for each of two available orthogonal circular polarizations, with individual beam patterns corresponding to each of the five geometries. Four of these geometries (A, B, C, and D in FIG. 7) are accomplished by analog processing of the available signals from the individual antennas. Pattern E, the fifth such geometry (FIG. 7) results from digital processing of the available signals from the individual antennas.

Referring to FIG. 7, the beam patterns thus produced are further described as follows:

A. An aggregate pattern of equal broad azimuth and elevation beamwidths w, such pattern A corresponding to the beam pattern of any single antenna in the array. This pattern is suitable for studies in which it is desired to maximize spatial sky coverage in both the right ascension and declination planes, and for which low angular resolution is sufficient. Such studies include, but are not limited to, broad sky surveillance for natural or artificial electromagnetic phenomena.

B. An elongated pattern of elevation beamwidth w and azimuth beamwidth (2w/n), where n is an integer multiple of four and equals the total number of antennas in the array, such pattern B corresponding to the beam pattern of all n/2 antennas in an East-West baseline, combined linearly in phase. This pattern is suitable for studies in which it is desired to maximize spatial sky coverage in the declination plane, while maximizing angular resolution in the right ascension plane. Such studies include, but are not limited to, drift-scan all-sky surveys for natural or artificial electromagnetic phenomena.

C. An elongated pattern of elevation beamwidth (2w/n) and azimuth beamwidth n, where n is an integer multiple of four and equals the total number of antennas in the array, such pattern C corresponding to the beam pattern of all n/2 antennas in a North-South baseline, combined linearly in phase. This pattern is suitable for studies in which it is desired to maximize spatial sky coverage in the right ascension plane, while maximizing angular resolution in the declination plane. Such studies include, but are not limited to, edge-on surveys of the ecliptic for natural or artificial electromagnetic phenomena.

D. A fixed spot pattern of equal azimuth and elevation beamwidths (2w/n), where n is an integer multiple of four and equals the total number of antennas in the array, such pattern D corresponding to the beam pattern of all n/2 antennas in an North-South baseline, plus all n/2 antennas in an East-West baseline, combined linearly in phase. This pattern is suitable for studies in which it is desired to maximize angular resolution in both the right ascension and the declination planes. Such studies include, but are not limited to, targeted searches for natural or artificial electromagnetic phenomena.

E. A steerable spot pattern of equal, narrow azimuth and elevation beamwidths (2w/n), where n is an integer multiple of four and equals the total number of antennas in the array, such pattern E corresponding to the beam pattern of all n/2 antennas in an North-South baseline, plus all n/2 antennas in an East-West baseline, combined in varying phases. This pattern is suitable for studies in which it is desired to maximize spatial sky coverage in both the right ascension and declination planes through aperture synthesis, while achieving high angular resolution in both the right ascension and the declination planes. Such studies include, but are not limited to, high-resolution sky mapping of natural or artificial electromagnetic phenomena.

As is common astronomical practice, in the foregoing discussions, Right Ascension refers to the aiming of the antennas with respect to the plane of the ecliptic, generally along an East-West line, and is dominated by the date and time of observation, and the observer's longitude, and changes according to the Earth's rotation on its axis. Right Ascension is generally measured in hours, minutes and seconds, with 24 hours of elapsed Right Ascension corresponding to one sidereal day. Thus, Right Ascension beamwidth most closely relates to the azimuth pattern of the antennas.

Similarly, as is common astronomical practice, in the foregoing discussion Declination refers to the aiming of the antennas with respect to the plane of the ecliptic, generally along a North-South line, and is dominated by the observer's latitude, as well as the antenna's elevation angle with respect to the Earth's horizon. Declination is generally measured in degrees, minutes and seconds North or South of the ecliptic. Thus, Declination beamwidth most closely relates to the elevation pattern of the antennas.

From the foregoing, it will be seen that this invention is one well adapted to obtain all the ends and objects herein set forth, together with other advantages which are inherent to the structure.

As many possible embodiments may be made of the invention without departing from the scope thereof, it is to be understood that all matter herein set forth or shown in the accompanying drawings is to be interpreted as illustrative and not in a limiting sense.

What is claimed is:

1. An adaptive array of microwave antennas for directly monitoring the electromagnetic environment, the array comprising:

a plurality of individual antennas, each providing two independent signals of mutually orthogonal polarization;

means for power dividing said two signals of mutually orthogonal polarization to provide two independent and identical output samples comprising a combined signal sample for subsequent analog processing and a phased signal sample for subsequent digital processing;

analog circuitry means for combining the analog samples from the individual antennas to simultaneously produce a circular beam pattern which is angularly broad in both azimuth and elevation, a combined elliptical beam pattern that is angularly broad in azimuth and angularly narrow in elevation, a combined elliptical beam pattern that is angularly narrow in azimuth and angularly broad in elevation; and, a combined circular beam pattern that is angularly narrow in azimuth, and angularly narrow in elevation; and, digital circuitry means for combining the digital phased signal samples to simultaneously produce at least one spot beam pattern which is angularly narrow in azimuth and angularly narrow in elevation, and which can be electronically steered anywhere within an area which is angularly broad in both azimuth and in elevation.

2. An adaptive antenna array adapted to be electronically steered for simultaneously establishing a plurality of beam patterns by directly monitoring the electromagnetic environment, said array comprising:

a phase center;

n individual antenna assemblies, each having at least one signal output, each of the n antennas arranged into four subarrays of n/4 antenna assemblies arranged in a row, the subarrays radially disposed about and projecting outwardly from the phase center in directions headed towards the North, South, East and West;

power splitter means on each signal output from each antenna assembly in the array for producing two identical signals allowing real-time simultaneous surveillance of the electromagnetic environment by both analog and digital processing means, the two identical signals comprising a phased signal for subsequent digital processing and a combined signal for subsequent analog processing;

analog circuit means for producing the following patterns from said combined signals:

Pattern A that is broad in both azimuth and elevation, and provides maximum sky coverage with minimum resolution;

Pattern B that is narrow in azimuth and broad in elevation, and is optimized for meridian transit ('drift-scan') sky surveys;

Pattern C that is broad in azimuth and narrow in elevation, and maximizes sky coverage in the equatorial plane while providing high resolution in the elevation axis; and, Pattern D comprising a narrow spot-beam formed by the intersection of patterns B and C, for higher resolution follow-up scrutiny of candidate signals detected in the earlier modes; and, digital circuit means responsive to said phased signals for producing a Pattern E comprising a narrow spot-beam that is steerable electronically and instantaneously anywhere within the beamwidth of the individual antennas.

3. The array as defined in claim 2 wherein each of the individual antenna assemblies comprises:
   a parabolic reflector having a focal point;
   a feed assembly mechanically disposed over the parabolic reflector at its focal point for collecting signals;
   two orthogonally polarized probes connected to the feed assembly;
   a gain and phase-matched low noise amplifier (LNA) connected to each probe for receiving and amplifying signals;
   quadrature coupler means for receiving the output of each LNA and outputting separate RHCP and LHCP signals;
   wherein said power splitter means comprises:
      a first phase splitter receiving said RHCP signal for outputting an RHCP phased signal and a separate RHCP combined signal; and,
      a second phase splitter receiving said LHCP signal for outputting an LHCP phased signal and a separate LHCP combined signal.

4. The array as defined in claim 3 wherein said digital circuit means for producing Pattern E comprises aperture synthesis correlator means for digitally processing the RHCP phased signals and LHCP phased signals ultimately derived from the feed assemblies and producing an amplitude countour map covering Pattern A that is broad in both azimuth and elevation, and provides maximum sky coverage, while simultaneously achieving maximum angular resolution, per pattern E.

5. The array as defined in claim 3 wherein said analog circuit means for deriving beam patterns A, B, C, and D comprises:
   analog power combiner means associated with each subarray for receiving and combining all of said n/4 LHCP combined signals;
   first power divider means associated with each subarray and driven by said last mentioned analog power combiner means for producing an LHCP Output A and an identical LHCP Output B from each subarray;
   analog power combiner means associated with each subarray for receiving and combining all of said n/4 RHCP combined signals; and,
   second power divider means associated with each subarray and driven by said last mentioned analog power combiner means for producing an RHCP Output A and an identical RHCP Output B signal from each sub array.

6. The array as defined in claim 5 wherein said first and second power divider means comprise two-port, in-phase, analog power dividers.

7. The array as defined in claim 5 further comprising a Quadrature Antenna Coupler assembly comprising a first plurality of interconnected quadrature hybrids for receiving the LHCP output A signals from each subarray and outputting an LHCP Pattern A signal, and a second plurality of interconnected quadrature hybrids for receiving the RHCP output A signals from each subarray and outputting an RHCP Pattern A signal.

8. The array as defined in claim 5 further comprising a Linear Antenna Coupler subassembly comprising a first plurality of interconnected in-phase power combiners for receiving the LHCP output B signals from each subarray and outputting LHCP Pattern B, C, and D signals, and a second plurality of interconnected in-phase power combiners for receiving the RHCP output B signals from each subarray and outputting RHCP Pattern B, C, and D signals.

9. A method for electronically establishing a plurality of beam patterns from an array of antenna assemblies, the method comprising the steps of:
   defining a phase center;
   providing n individual antennas;
   arranging the n individual antennas into four subarrays of n/4 antennas arranged in a row, the subarrays radially disposed about and projecting outwardly from the phase center in directions headed towards the North, South, East and West;
   obtaining an LHCP and an RHCP signal output from each antenna;
   splitting each LHCP and an RHCP signal output from each antenna in the array for producing two identical phased and combined signals therefrom;
   analog processing said combined signals to produce the following reception patterns:
      Pattern A that is broad in both azimuth and elevation, and provides maximum sky coverage with minimum resolution;
      Pattern B that is narrow in azimuth and broad in elevation, and is optimized for meridian transit ('drift-scan') sky surveys;
      Pattern C that is broad in azimuth and narrow in elevation, and maximizes sky coverage in the equatorial plane while providing high resolution in the elevation axis; and,
      Pattern D comprising a narrow spot-beam formed by the intersection of patterns B and C, for higher resolution follow-up scrutiny of candidate signals detected in the earlier modes; and,
   digitally processing said phased signals to produce a Pattern E comprising a narrow spot-beam which is steerable electronically and instantaneously anywhere within the beamwidth of the individual antennas.

10. The method as defined in claim 9 wherein:
   said step of digitally processing said RHCP phased signals and LHCP phased signals is accomplished with aperture synthesis correlator means thereby producing said pattern E; and,
   said analog step of deriving four additional beam patterns A, B, C, and D employs analog power combiner means associated with each subarray for receiving and combining all of said LHCP combined signals and all of said RHCP combined signals.

11. The method as defined in claim 10 wherein said step of deriving four additional beam patterns A, B, C, and D comprises the steps of:
   producing an LHCP Output A and an identical LHCP Output B from each subarray by combining the LHCP combined signals;
   producing an RHCP Output A and an identical RHCP Output B from each subarray by combining the RHCP combined signals;
   producing an LHCP Pattern A signal from said LHCP output A signals and an RHCP Pattern A signal from said RHCP output A signals through a quadrature hybrid circuit; and,
   delivering the LHCP and RHCP output B signals from each subarray to a power combiner circuit for outputting LHCP Pattern B, C, and D signals and LHCP Pattern B, C, and D signals.

12. An electronically steerable antenna array for simultaneously establishing a plurality of beam patterns for monitoring weak electromagnetic signals, said array comprising:
   a phase center;
   a plurality of individual antenna assemblies providing at least one LHCP signal output and at least one RHCP signal output, the antenna assemblies arranged within four subarrays, each subarray comprising an equal number of individual, spaced apart antenna assemblies aligned within a row, each subarray row radially disposed about and projecting outwardly from said phase center in directions headed towards the North, South, East and West;

means responsive to each RHCP and LHCP signal output from each antenna assembly for concurrently outputting an RHCP phased signal and an LHCP phased signal for subsequent digital processing, and an RHCP combined signal and an LHCP combined signal for subsequent analog processing;

analog circuit means for producing the following patterns from said RHCP and LHCP combined signals:

Pattern A that is broad in both azimuth and elevation, and provides maximum sky coverage with minimum resolution;

Pattern B that is narrow in azimuth and broad in elevation, and is optimized for meridian transit ('drift-scan') sky surveys;

Pattern C that is broad in azimuth and narrow in elevation, and maximizes sky coverage in the equatorial plane while providing high resolution in the elevation axis; and, Pattern D comprising a narrow spot-beam formed by the intersection of patterns B and C, for higher resolution follow-up scrutiny of candidate signals detected in the earlier modes; and, digital circuit means for producing a Pattern B from said RHCP and said LHCP phased signals, said pattern E comprising a narrow spot-beam that is steerable electronically and instantaneously anywhere within the beamwidth of the individual antenna assemblies.

13. The array as defined in claim 12 wherein each of the antenna assemblies comprises:

a feed assembly mechanically associated with each individual antenna for collecting signals;

two orthogonally polarized probes connected to the feed assembly;

a gain and phase-matched low noise amplifier (LNA) connected to each probe for receiving and amplifying signals;

quadrature coupler means for receiving the output of each LNA and outputting said RHCP and LHCP signals;

wherein said power splitter means comprises:

a first phase splitter receiving said RHCP signal for outputting said RHCP phased signal and said RHCP combined signal; and, a second phase splitter receiving said LHCP signal for outputting said LHCP phased signal and said LHCP combined signal.

14. The array as defined in claim 13 wherein said analog circuit means for deriving beam patterns A, B, C, and D comprises:

analog power combiner means associated with each subarray for receiving and combining all of said LHCP combined signals;

first power divider means associated with each subarray and driven by said last mentioned analog power combiner means for producing an LHCP Output A and an identical LHCP Output B from each subarray;

analog power combiner means associated with each subarray for receiving and combining all of said RHCP combined signals; and, second power divider means associated with each subarray and driven by said last mentioned analog power combiner means for producing an RHCP Output A and an identical RHCP Output B signal from each subarray.

15. The array as defined in claim 14 further comprising a Quadrature Antenna Coupler assembly comprising a first plurality of interconnected quadrature hybrids for receiving the LHCP output A signals from each subarray and outputting an LHCP Pattern A signal, and a second plurality of interconnected quadrature hybrids for receiving the RHCP output A signals from each subarray and outputting an RHCP Pattern A signal.

16. The array as defined in claim 14 further comprising a Linear Antenna Coupler subassembly comprising a first plurality of interconnected in-phase power combiners for receiving the LHCP output B signals from each subarray and outputting LHCP Pattern B, C, and D signals, and a second plurality of interconnected in-phase power combiners for receiving the RHCP output B signals from each subarray and outputting RHCP Pattern B, C, and D signals.

* * * * *